United States Patent [19]

Ishikawa et al.

[11] Patent Number: 5,015,852
[45] Date of Patent: May 14, 1991

[54] RADIATION IMAGE READ-OUT APPARATUS

[75] Inventors: Hiromi Ishikawa; Sumihiro Nishihata, both of Kanagawa, Japan

[73] Assignee: Fuji Photo Film Co., Ltd., Kanagawa, Japan

[21] Appl. No.: 476,229

[22] Filed: Feb. 7, 1990

[30] Foreign Application Priority Data

Feb. 20, 1989 [JP] Japan .................................. 1-39515

[51] Int. Cl.$^5$ ............................................ G01N 23/04
[52] U.S. Cl. ................................................ 250/327.2
[58] Field of Search ........................... 250/327.2, 484.1

[56] References Cited

U.S. PATENT DOCUMENTS

| | | | |
|---|---|---|---|
| 4,258,264 | 3/1981 | Kotera et al. | 250/484.1 |
| 4,276,473 | 6/1981 | Kato et al. | 250/327.2 |
| 4,315,318 | 2/1982 | Kato et al. | 250/337 |
| 4,346,295 | 8/1982 | Tanaka et al. | 250/327.2 |
| 4,387,428 | 6/1983 | Ishida et al. | 250/337 |
| 4,680,473 | 7/1987 | Matsuda et al. | 250/484.1 |
| 4,818,880 | 4/1989 | Matsuda et al. | 250/327.2 |
| 4,864,134 | 9/1989 | Hosoi et al. | 250/327.2 |

FOREIGN PATENT DOCUMENTS 56-11395 2/1981 Japan .

OTHER PUBLICATIONS

"Lens-Prism Kako Gijutsu", p. 173 (1972).

Primary Examiner—Carolyn E. Fields
Attorney, Agent, or Firm—Sughrue, Mion, Zinn, Macpeak & Seas

[57] ABSTRACT

A radiation image read-out apparatus comprises a main scanning system which scans a stimulable phosphor sheet, on which a radiation image has been stored, with stimulating rays in a main scanning direction. The stimulating rays cause the stimulable phosphor sheet to emit light in proportion to the amount of energy stored thereon during its exposure to radiation. A sub-scanning system moves the stimulable phosphor sheet with respect to the stimulating rays in a direction approximately normal to the main scanning direction. A light guide member, which has a light input face extending along a main scanning line on the stimulable phosphor sheet, guides the emitted light entering the light guide member at its light input face to a light output face. A photodetector is connected to the light output face. A stimulating ray antireflection film is overlaid on the light input face, and further, may be overlaid over any provided reflection mirror. The stimulating ray antireflection film is designed so that the reflectivity of the stimulating rays from the stimulating ray antireflection film is lowest when the stimulating rays impinge thereupon at an angle of incidence which falls within the range of 30° to 50°.

14 Claims, 4 Drawing Sheets

RADIATION IMAGE READ-OUT APPARATUS

BACKGROUND OF THE INVENTION

1. Field of the Invention

This invention relates to an apparatus for reading out a radiation image which has been stored on a stimulable phosphor sheet. This invention particularly relates to a radiation image read-out apparatus with which light emitted by a stimulable phosphor sheet in proportion to the amount of energy stored thereon during its exposure to radiation can be detected accurately.

2. Description of the Prior Art

When certain kinds of phosphors are exposed to radiation such as X-rays, α-rays, β-rays, γ-rays, cathode rays or ultraviolet rays, they store part of the energy of the radiation. Then, when the phosphor which has been exposed to the radiation is exposed to stimulating rays such as visible light, light is emitted by the phosphor in proportion to the amount of energy stored during exposure to the radiation. A phosphor exhibiting such properties is referred to as a stimulable phosphor.

As disclosed in U.S. Pat. Nos. 4,258,264, 4,276,473, 4,315,318, 4,387,428, and Japanese Unexamined Pat. Publication No. 56(1981)-11395, it has been proposed to use stimulable phosphors in radiation image recording and reproducing systems. Specifically, a sheet provided with a layer of the stimulable phosphor (hereinafter referred to as a stimulable phosphor sheet) is first exposed to radiation which has passed through an object such as the human body in order to store a radiation image of the object thereon, and is then scanned with stimulating rays, such as a laser beam, which cause it to emit light in proportion to the amount of energy stored during exposure to the radiation. The light, which is emitted by the stimulable phosphor sheet when it is stimulated, is photoelectrically detected and converted into an electric image signal. The image signal is then used to reproduce the radiation image of the object as a visible image on a recording material such as photographic film, on a display device such as a cathode ray tube (CRT), or the like.

FIG. 4 is a perspective view showing a conventional radiation image read-out apparatus. It has been proposed to use radiation image read-out apparatuses like that shown in FIG. 4 in the radiation image recording and reproducing systems described above. With such a radiation image read-out apparatus, a stimulable phosphor sheet, on which a radiation image has been stored, can be scanned with stimulating rays, such as a laser beam, which cause the stimulable phosphor sheet to emit light in proportion to the amount of energy stored thereon during its exposure to radiation, and the emitted light can be photoelectrically detected.

In the radiation image read-out apparatus of FIG. 4, stimulating rays 2 are produced by a stimulating ray source 1, and the beam diameter of the stimulating rays 2 is precisely adjusted by a beam expander 3. Thereafter, stimulating rays 2 are deflected by a light deflector 4, which may be constituted of a galvanometer mirror or the like. The deflected stimulating rays 2 are reflected by a plane reflection mirror 5, after which they impinge upon a stimulable phosphor sheet 10 and scan it in the main scanning directions indicated by the double headed arrow A. An fθ lens 6 is located in the optical path of the deflected stimulating rays 2 between the light deflector 4 and the plane reflection mirror 5. The fθ lens 6 keeps the beam diameter of the stimulating rays 2 uniform, and stimulating rays 2 having a uniform beam diameter scan the stimulable phosphor sheet 10 at a constant speed in the main scanning directions. In the illustrated radiation image read-out apparatus, the stimulating ray source 1, the beam expander 3, the light deflector 4, the plane reflection mirror 5, and the fθ lens 6 constitute a main scanning means. While the stimulating rays 2 impinge upon the stimulable phosphor sheet 10, the stimulable phosphor sheet 10 is moved by a sub-scanning means, which may be constituted of an endless belt device 20, in the sub-scanning direction indicated by the arrow B, which direction is approximately normal to the main scanning directions. Consequently, the whole surface of the stimulable phosphor sheet 10 is exposed to the stimulating rays 2. When it is being exposed to the stimulating rays 2, the stimulable phosphor sheet 10 emits light in proportion to the amount of energy stored thereon during its exposure to radiation. The emitted light enters a light guide member 8. The light guide member 8 has a linear light input face 8a which is positioned along a main scanning line 2c on the stimulable phosphor sheet 10. A ring-shaped light output face 8b of the light guide member 8 is connected to a light receiving face of a photodetector 9, which may be constituted of a photomultiplier. The light guide member 8 is made from a transparent thermoplastic resin sheet, such as an acrylic resin sheet, so that light which has entered the light guide member 8 at its light input face 8a is guided through repeated total reflection inside of the light guide member 8 to the light output face 8b. The light, which has been emitted by the stimulable phosphor sheet 10 and which has entered the light guide member 8, is guided inside of the light guide member 8, emanates from the light output face 8b, and is detected by the photodetector 9. Shapes and materials which are suitable for the light guide member 8 are disclosed in, for example, U.S. Pat. No. 4,346,295.

A filter (not shown) is positioned so that it is in close contact with the light receiving face of the photodetector 9. The filter transmits only light whose wavelengths fall within the wavelength distribution range of the light emitted by the stimulable phosphor sheet 10, and filters out light whose wavelengths fall within the wavelength distribution range of the stimulating rays 2. Therefore, only light which is emitted by the stimulable phosphor sheet 10 will be detected by the photodetector 9. The photodetector 9 converts the light emitted by the stimulable phosphor sheet 10 into an electric signal and feeds it into an image processing circuit 11 which processes the electric signal. The processed electric signal is fed into an image reproducing apparatus, which may be constituted of a CRT, a light beam scanning recording apparatus, or the like, and is used to reproduce a visible image. Alternatively, the processed electric signal may be stored on a magnetic tape or the like.

Also, in the radiation image read-out apparatus described above, in order to improve the efficiency with which the light emitted by the stimulable phosphor sheet 10, when it is scanned with the stimulating rays 2, is guided, a reflection mirror 14 is often located facing the light input face 8a of the light guide member 8 with the main scanning line 2c intervening therebetween. The reflection mirror 14 reflects the light which is emitted from the position on the stimulable phosphor sheet 10 which is being scanned. The light advances from the side opposite to the light guide member 8 towards the light input face 8a of the light guide member 8.

FIG. 5 is a schematic side view showing a major part of the radiation image read-out apparatus shown in FIG. 4. As illustrated in FIG. 5, in the conventional radiation image read-out apparatus described above, a part 2a of the stimulating rays 2 impinging upon a position on the stimulable phosphor sheet 10, which position is being scanned at any given instant, is reflected by the surface of the stimulable phosphor sheet 10. These reflected stimulating rays 2a are then reflected by the light input face 8a of the light guide member 8 and impinge upon a position on the stimulable phosphor sheet 10 which is not being scanned at the given instant, which causes said position on the stimulable phosphor sheet which is not being scanned to emit light. (This phenomenon is referred to as the flare phenomenon.) When the flare phenomenon occurs, light emitted from the position on the stimulable phosphor sheet 10, which position is not being scanned at the given instant, enters the light guide member 8 and is detected by the photodetector 9 together with the light which is emitted from the position on the stimulable phosphor sheet 10, which position is being scanned at the given instant. Therefore, the radiation image stored on the stimulable phosphor sheet 10 cannot be read out accurately, and the contrast in a visible radiation image which is reproduced from the image signal thus detected will be low.

Also, in cases where the reflection mirror 14 is located as illustrated in FIG. 5, parts 2a, 2a of the stimulating rays 2, which have been reflected from the position on the stimulable phosphor sheet 10, which position is being scanned at the given instant, toward a reflection surface 14a of the reflection mirror 14, are reflected by the reflection surface 14a towards the light input face 8a of the light guide member 8. The reflected stimulating rays 2a, 2a are even further reflected by the light input face 8a, and impinge upon positions on the stimulable phosphor sheet 10, which positions are not being scanned at the given instant. Therefore, when the reflection mirror 14 is provided, an even larger adverse effect occurs from the flare phenomenon, even though the efficiency, with which the light emitted by the stimulable phosphor sheet 10 is guided, is improved.

In order to reduce the adverse effects of the flare phenomenon, the applicant has proposed various radiation image read-out apparatuses.

For example, in U.S. Pat. No. 4,818,880, a radiation image read-out apparatus is disclosed wherein an antireflection film is overlaid on a light input face of the light guide member in order to prevent stimulating rays from being reflected by the light input face. Stimulating rays reflected from a stimulable phosphor sheet are allowed to enter the light guide member and are filtered out by a filter, which is positioned between a light output face of the light guide member and a light receiving face of a photodetector. Also, U.S. Pat. No. 4,680,473 discloses a radiation image read-out apparatus wherein an antireflection film, which will prevent stimulating rays from being reflected by a reflection mirror, is overlaid on a reflection surface of the reflection mirror.

In the disclosed radiation image read-out apparatuses wherein an antireflection film is overlaid on a light input face of a light guide member or on a reflection surface of a reflection mirror, the antireflection characteristics of the antireflection film vary in accordance with the angle of incidence of the stimulating rays, which have been reflected from a stimulable phosphor sheet, upon the antireflection film. It has heretofore been considered to be important that stimulating rays, which have been reflected from a stimulable phosphor sheet and which impinge at a comparatively small angle of incidence upon the light input face of the light guide member or upon the reflection surface of the reflection mirror, be prevented as much as possible from being reflected by the light input face or the reflection surface. Therefore, the antireflection film has heretofore been designed so that its reflectivity is lowest for the reflected stimulating rays, which impinge at an angle of incidence of 0° upon the antireflection film. However, it has recently been revealed that stimulating rays, which are reflected from a position on a stimulable phosphor sheet and impinge at a large angle of incidence upon the light input face of the light guide member or upon the reflection surface of the reflection mirror, have an even greater adverse effect upon the image quality of an image, which is reproduced from an image signal detected from the stimulable phosphor sheet, than those stimulating rays, which are reflected from the stimulable phosphor sheet and impinge at a comparatively small angle of incidence upon the light input face of the light guide member or upon the reflection surface of the reflection mirror. Specifically, stimulating rays, which have been reflected from a position on a stimulable phosphor sheet, which is being scanned at any given instant, and impinge at a large angle of incidence upon the light input face of the light guide member, are reflected by the light input face of the light guide member, and impinge upon and stimulate positions on the stimulable phosphor sheet, which are spaced far apart from the position on the stimulable phosphor sheet which is being scanned at the given instant. Also, stimulating rays, which have been reflected from the position on the stimulable phosphor sheet, which is being scanned at any given instant, and impinge at a large angle of incidence upon the reflection surface of the reflection mirror, are reflected by the reflection surface of the reflection mirror to the light input face of the light guide member, are then reflected by the light input face of the light guide member, and impinge upon and stimulate positions on the stimulable phosphor sheet, which are spaced far apart from the position on the stimulable phosphor sheet which is being scanned at the given instant. For example, if the stimulating rays thus reflected from the light input face of the light guide member stimulate positions on the stimulable phosphor sheet, which are spaced far apart from the position on the stimulable phosphor sheet which position is being scanned at any given instant, the change in image density will not be sharp at regions of the image where it should be sharp, or black lines will appear along directions in which the flare phenomenon has occurred. Therefore, the conventional antireflection film cannot substantially eliminate the problem of stimulating rays being reflected from a stimulable phosphor sheet and impinging at a large angle of incidence upon the light input face of the light guide member or upon the reflection surface of the reflection mirror.

SUMMARY OF THE INVENTION

The primary object of the present invention is to provide a radiation image read-out apparatus wherein stimulating rays, which have impinged upon a position on a stimulable phosphor sheet being scanned at any given instant and which have been reflected therefrom, are primarily prevented from impinging upon and stimulating different positions on the stimulable phosphor sheet, which positions are not being scanned at the given instant and are spaced far apart from the position which is being scanned at the given instant.

Another object of the present invention is to provide a radiation image read-out apparatus which enables the reproduction of a visible image having good image quality.

The present invention provides a first radiation image read-out apparatus comprising:

(i) a main scanning means which scans a stimulable phosphor sheet, on which a radiation image has been stored, with stimulating rays in a main scanning direction, the stimulating rays causing the stimulable phosphor sheet to emit light in proportion to the amount of energy stored thereon during its exposure to radiation, (ii) a sub-scanning means which moves the stimulable phosphor sheet with respect to the stimulating rays in a sub-scanning direction approximately normal to the main scanning direction, (iii) a light guide member which has a light input face extending along a main scanning line on the stimulable phosphor sheet and which guides the light emitted by the stimulable phosphor sheet and entering the light guide member at its light input face to a light output face of the light guide member, and (iv) a photodetector which is connected to the light output face of the light guide member, wherein the improvement comprises the provision of a stimulating ray antireflection film, which is overlaid on said light input face of said light guide member and which prevents said stimulating rays from being reflected by said light input face, said stimulating ray antireflection film being designed so that the reflectivity of said stimulating rays from said stimulating ray antireflection film is lowest when said stimulating rays impinge thereupon at an angle of incidence which falls within the range of 30° to 50°.

The present invention also provides a second radiation image read-out apparatus comprising:

(i) a main scanning means which scans a stimulable phosphor sheet, on which a radiation image has been stored, with stimulating rays in a main scanning direction, the stimulating rays causing the stimulable phosphor sheet to emit light in proportion to the amount of energy stored thereon during its exposure to radiation, (ii) a sub-scanning means which moves the stimulable phosphor sheet with respect to the stimulating rays in a sub-scanning direction approximately normal to the main scanning direction, (iii) a light guide member which has a light input face extending along a main scanning line on the stimulable phosphor sheet and which guides the light emitted by the stimulable phosphor sheet and entering the light guide member at its light input face to a light output face of the light guide member, (iv) a photodetector which is connected to the light output face of the light guide member, and (v) a reflection mirror which is positioned facing said light input face of said light guide member with said main scanning line intervening between said reflection mirror and said light input face, said reflection mirror reflecting said light, which has been emitted by said stimulable phosphor sheet, towards said light input face, wherein the improvement comprises the provision of:

(a) a stimulating ray antireflection film, which is overlaid on said light input face of said light guide member and which prevents said stimulating rays from being reflected by said light input face, said stimulating ray antireflection film being designed so that the reflectivity of said stimulating rays from said stimulating ray antireflection film is lowest when said stimulating rays impinge thereupon at an angle of incidence which falls within the range of 30° to 50°, and/or (b) a stimulating ray antireflection film, which is overlaid on a reflection surface of said reflection mirror and which prevents said stimulating rays from being reflected by said reflection surface, said stimulating ray antireflection film being designed so that the reflectivity of said stimulating rays from said stimulating ray antireflection film is lowest when said stimulating rays impinge thereupon at an angle of incidence which falls within the range of 30° to 50°.

In order for the stimulating ray antireflection film to exhibit the characteristics defined above, its refractive index, thickness, or the like, may be set specifically. Such techniques are described in, for example, "Lens . Prism Kako Gijutsu" (Lens and Prism Processing Technology), p. 173 (1972) published by Kogaku-kogyo Gijutsu Kenkyu Kumiai.

As will be understood from the specification, it should be noted that the term "moving a stimulable phosphor sheet with respect to stimulating rays in a subscanning direction" as used herein means movement of the stimulable phosphor sheet relative to the stimulating rays in the sub-scanning direction, and embraces both the cases wherein the stimulable phosphor sheet is moved while the stimulating rays are kept stationary with respect to the sub-scanning direction, and cases wherein the stimulating rays are moved in the sub-scanning direction while the stimulable phosphor sheet is kept stationary.

Studies carried out by the inventors revealed that, of the stimulating rays which are reflected from a position on a stimulable phosphor sheet, which is being scanned at any given instant, to the light input face of the light guide member, which are then reflected by the light input face of the light guide member, and which thereafter impinge upon the stimulable phosphor sheet, those stimulating rays which ultimately impinge upon and stimulate positions on the stimulable phosphor sheet, which are spaced approximately 10 mm to 50 mm apart from the position on the stimulable phosphor sheet which is being scanned at the given instant, particularly adversely affect the image quality of an image, which is reproduced from an image signal detected from the stimulable phosphor sheet. Also, it was revealed that, of the stimulating rays which are reflected from a position on a stimulable phosphor sheet, which is being scanned at any given instant, to the reflection surface of the reflection mirror, which are then reflected by the reflection surface of the reflection mirror to the light input face of the light guide member and reflected by the light input face of the light guide member, and which thereafter impinge upon the stimulable phosphor sheet, those stimulating rays which ultimately impinge upon and stimulate positions on the stimulable phosphor sheet, which are spaced approximately 10 mm to 50 mm apart from the position on the stimulable phosphor sheet which is being scanned at the given instant, particularly adversely affect the image quality of an image, which is reproduced from an image signal detected from the stimulable phosphor sheet.

With the first radiation image read-out apparatus in accordance with the present invention, a stimulating ray antireflection film is overlaid on the light input face of the light guide member. Also, with the second radiation image read-out apparatus in accordance with the present invention, a stimulating ray antireflection film is overlaid on the light input face of the light guide member, and/or a stimulating ray antireflection film is overlaid on the reflection surface of the reflection mirror. The stimulating ray antireflection film is designed so that the reflectivity of the stimulating rays from the stimulating ray antireflection film is lowest when the stimulating rays (i.e. the stimulating rays which have been reflected from the position on the stimulable phosphor sheet which is being scanned at any given instant) impinge at an angle of incidence, which falls within the range of 30° to 50°, upon the stimulating ray antireflection film. Therefore, with the first and second radiation image read-out apparatuses in accordance with the present invention, it is possible efficiently to prevent the reflected stimulating rays from ultimately impinging upon and stimulating positions on the stimulable phosphor sheet which are spaced approximately 10 mm to 50 mm apart from the position on the stimulable phosphor sheet which is being scanned at the given instant. Accordingly, it becomes possible to reproduce a visible image having good image quality.

FIG. 6A is a graph showing what proportion of certain stimulating rays has impinged upon the light input face of a light guide member at various angles of incidence, said stimulating rays having been reflected by the light input face and followed a path impinging upon a position on a stimulable phosphor sheet which is spaced 0 mm apart from the position on the stimulable phosphor sheet which is being scanned at any given instant. FIG. 6B is a graph showing what proportion of certain stimulating rays has impinged upon the light input face of a light guide member at various angles of incidence, said stimulating rays having been reflected by the light input face and having followed a path impinging upon a position on a stimulable phosphor sheet which is spaced 20 mm apart from the position on the stimulable phosphor sheet which is being scanned at any given instant. FIG. 6C is a graph showing what proportion of certain stimulating rays has impinged upon the light input face of a light guide member at various angles of incidence, said stimulating rays having been reflected by the light input face and having followed a path impinging upon a position on a stimulable phosphor sheet which is spaced 40 mm apart from the position on the stimulable phosphor sheet which is being scanned at any given instant. FIG. 6D is a graph showing what proportion of certain stimulating rays has impinged upon the light input face of a light guide member at various angles of incidence, said stimulating rays having been reflected by the light input face and having followed a path impinging upon a position on a stimulable phosphor sheet which is spaced 60 mm apart from the position on the stimulable phosphor sheet which is being scanned at any given instant.

Specifically, as is clear from FIGS. 6A, 6B, 6C, and 6D, in cases where the light input face of the light guide member is provided with a stimulating ray antireflection film designed so that the reflectivity of the stimulating rays from the stimulating ray antireflection film is very low when the stimulating rays (i.e. the stimulating rays which have been reflected from the position on the stimulable phosphor sheet which is being scanned at any given instant) impinge at an angle of incidence, which falls within the range of 30° to 50°, upon the stimulating ray antireflection film, it is possible efficiently to reduce the amount of the reflected stimulating rays which ultimately impinge upon positions on the stimulable phosphor sheet, which are spaced approximately 10 mm to 50 mm apart from the position on the stimulable phosphor sheet which is being scanned at the given instant. The stimulating ray antireflection film, which is designed so that the reflectivity of the stimulating rays from the stimulating ray antireflection film is lowest when the stimulating rays impinge thereupon at an angle of incidence which falls within the range of 30° to 50°, also exhibits a lower reflectivity with respect to stimulating rays which are incident at an angle larger than 50° than an antireflection film, which is designed so that the reflectivity with respect to the stimulating rays incident at an angle of 0° is lowest. These effects also apply to a stimulating ray antireflection film overlaid on the reflection surface of a reflection mirror.

DESCRIPTION OF THE PREFERRED EMBODIMENTS

The present invention will hereinbelow be described in further detail with reference to the accompanying drawings.

Figure 1:
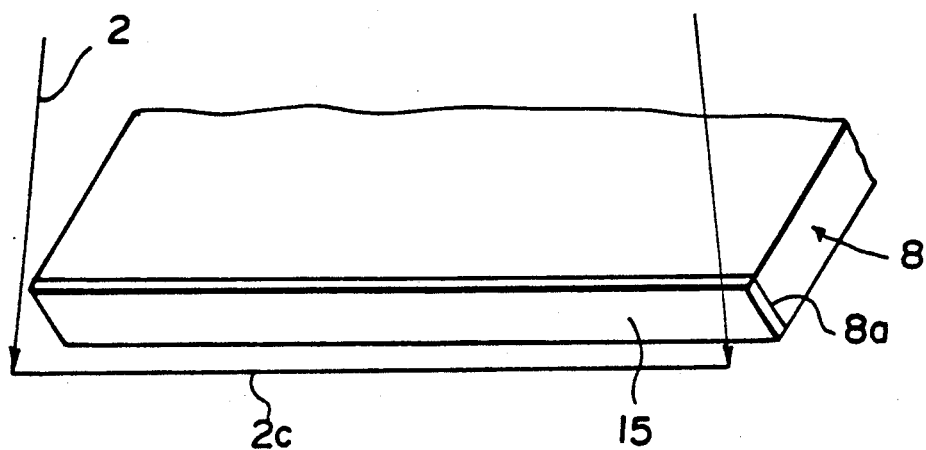
FIG. 1 is a perspective view showing a major part of the light guide member used in an embodiment of the radiation image read-out apparatus in accordance with the present invention.
Figure 4:
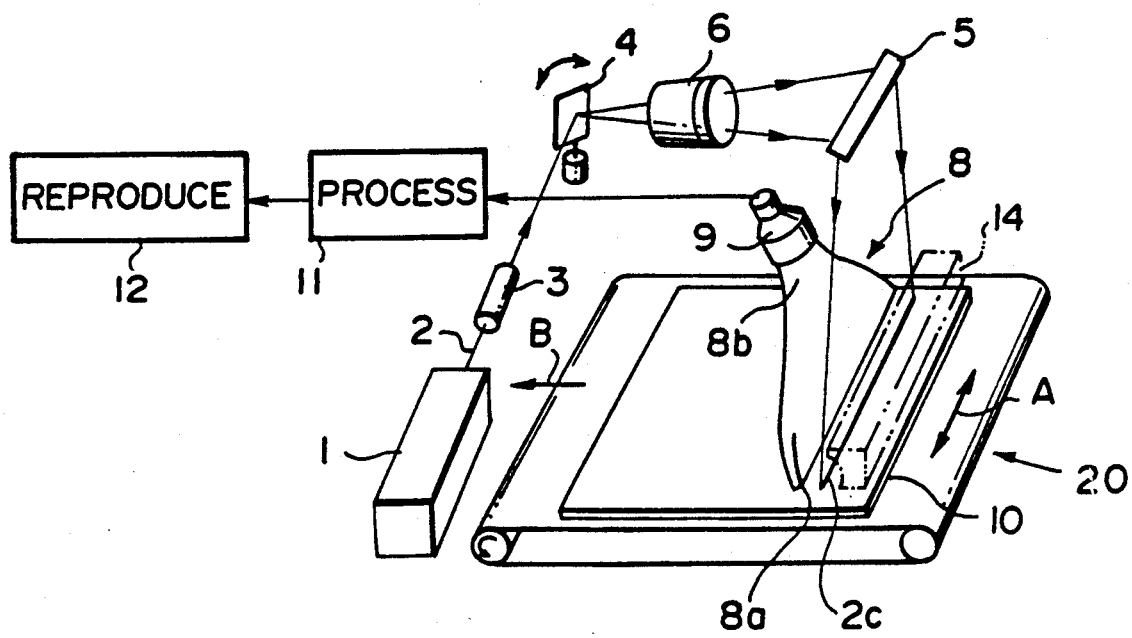
FIG. 4 is a perspective view showing a conventional radiation image read-out apparatus.
Figure 5:
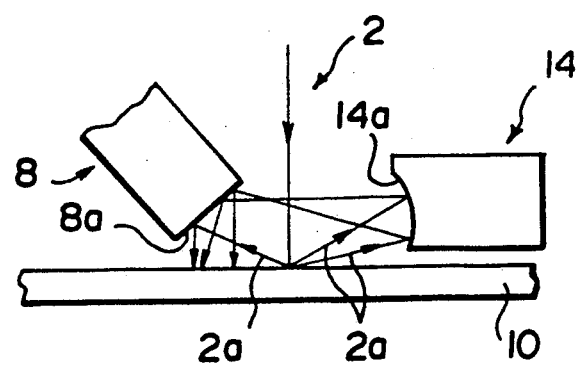
FIG. 5 is a schematic side view showing a major part of the conventional radiation image read-out apparatus shown in FIG. 4.
Figure 6A:
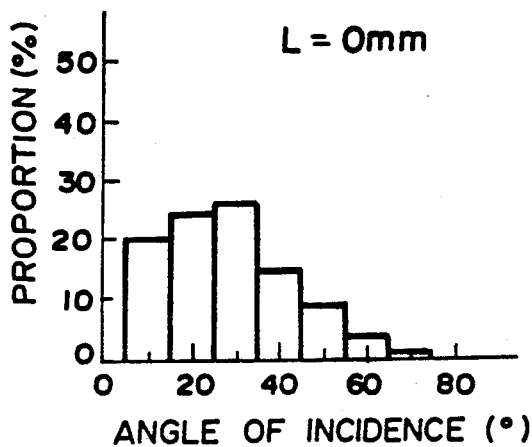
FIG. 6A is a graph showing what proportion of certain stimulating rays has impinged upon the light input face of a light guide member at various angles, said stimulating rays having been reflected by the light input face and having followed a path impinging upon a position on a stimulable phosphor sheet which is spaced 0 mm apart from the position on the stimulable phosphor sheet which is being scanned at any given instant.
Figure 6B:
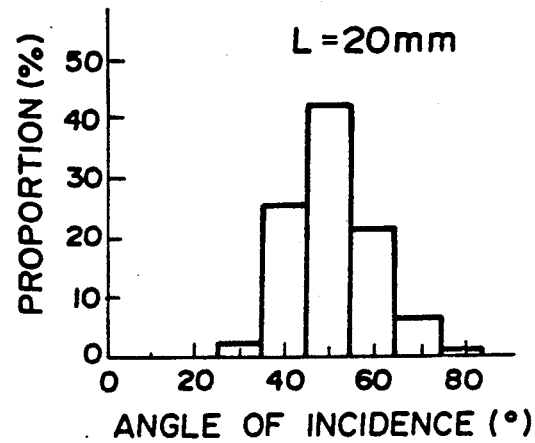
FIG. 6B is a graph showing what proportion of certain stimulating rays has impinged upon the light input face of a light guide member at various angles of incidence, said stimulating rays having been reflected by the light input face and having followed a path impinging upon a position on a stimulable phosphor sheet which is spaced 20 mm apart from the position on the stimulable phosphor sheet which is being scanned at any given instant.
Figure 6C:
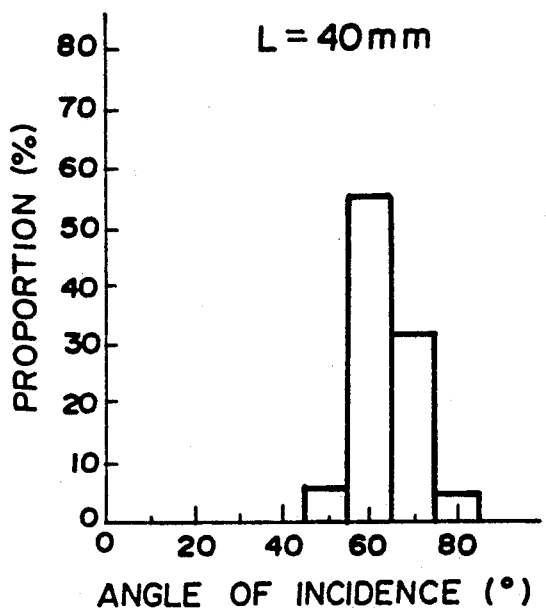
FIG. 6C is a graph showing what proportion of certain stimulating rays has impinged upon the light input face of a light guide member at various angles of incidence, said stimulating rays having been reflected by the light input face and having followed a path impinging upon a position on a stimulable phosphor sheet which is spaced 40 mm apart from the position on the stimulable phosphor sheet which is being scanned at any given instant.
Figure 6D:
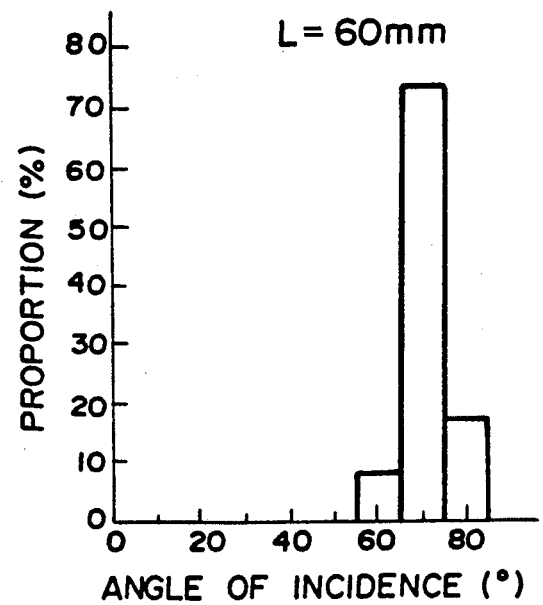
FIG. 6D is a graph showing what proportion of certain stimulating rays has impinged upon the light input face of a light guide member at various angles of incidence, said stimulating rays having been reflected by the light input face and having followed a path impinging upon a position on a stimulable phosphor sheet which is spaced 60 mm apart from the position on the stimulable phosphor sheet which is being scanned at any given instant.

FIG. 1 shows part of a light guide member in the vicinity of its light input face, which light guide member is employed in an embodiment of the radiation image read-out apparatus in accordance with the present invention. The radiation image read-out apparatus has the same configuration as that shown in FIG. 4, except for the par of the light guide member in the vicinity of its light input face.

The light guide member 8 has a light input face 8a extending along a main scanning line 2c which is formed by stimulating rays 2 on a stimulable phosphor sheet. A stimulating ray antireflection film 15 is overlaid on the light input face 8a.

Figure 2:
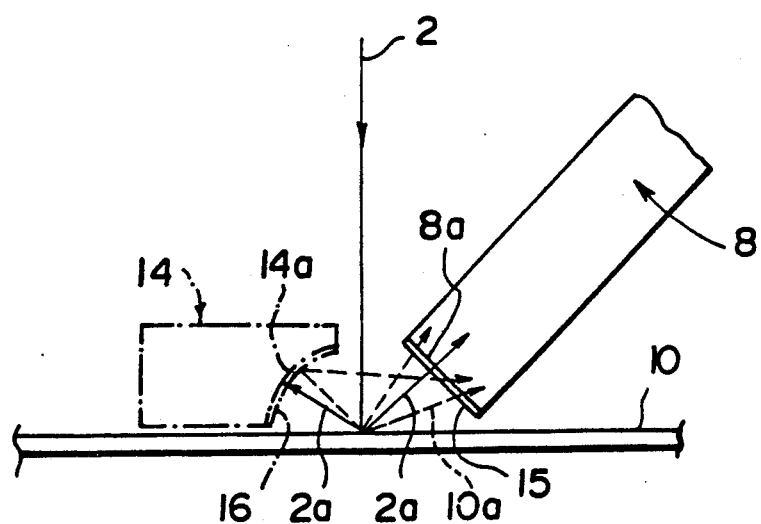
FIG. 2 is a schematic side view showing a major part of the light guide member and a reflection mirror, which side view is taken along the main scanning direction which is normal to the plane of the sheet of FIG. 2.

As shown in FIG. 2, the stimulating ray antireflection film 15 prevents stimulating rays 2a, which have been reflected from the position on the stimulable phosphor sheet which is being scanned with the stimulating rays 2 at any given instant, from being reflected by the light input face 8a of the light guide member 8. The stimulating ray antireflection film 15 also prevents light 10a, which has been emitted from the position on the stimulable phosphor sheet which is being scanned with the stimulating rays 2 at any given instant, from being reflected by the light input face 8a of the light guide member 8. The stimulating ray antireflection film 15 allows the emitted light 10a to enter the light guide member 8 efficiently. By way of example, when a stimulating ray antireflection film 15 exhibiting such characteristics is prepared, a plurality of (for example, two) layers exhibiting different refractive indexes are overlaid on the light input face 8a with a vacuum evaporation process.

The reflected stimulating rays 2a, which are not reflected by the stimulating ray antireflection film 15 and which have entered the light guide member 8, are absorbed and filtered out by a filter (not shown in FIG. 2) located between the light output face of the light guide member 8 and a photomultiplier (not shown in FIG. 2). Only the emitted light 10a, which has entered the light guide member 8, passes through the filter and is detected by the photomultiplier.

Figure 3:
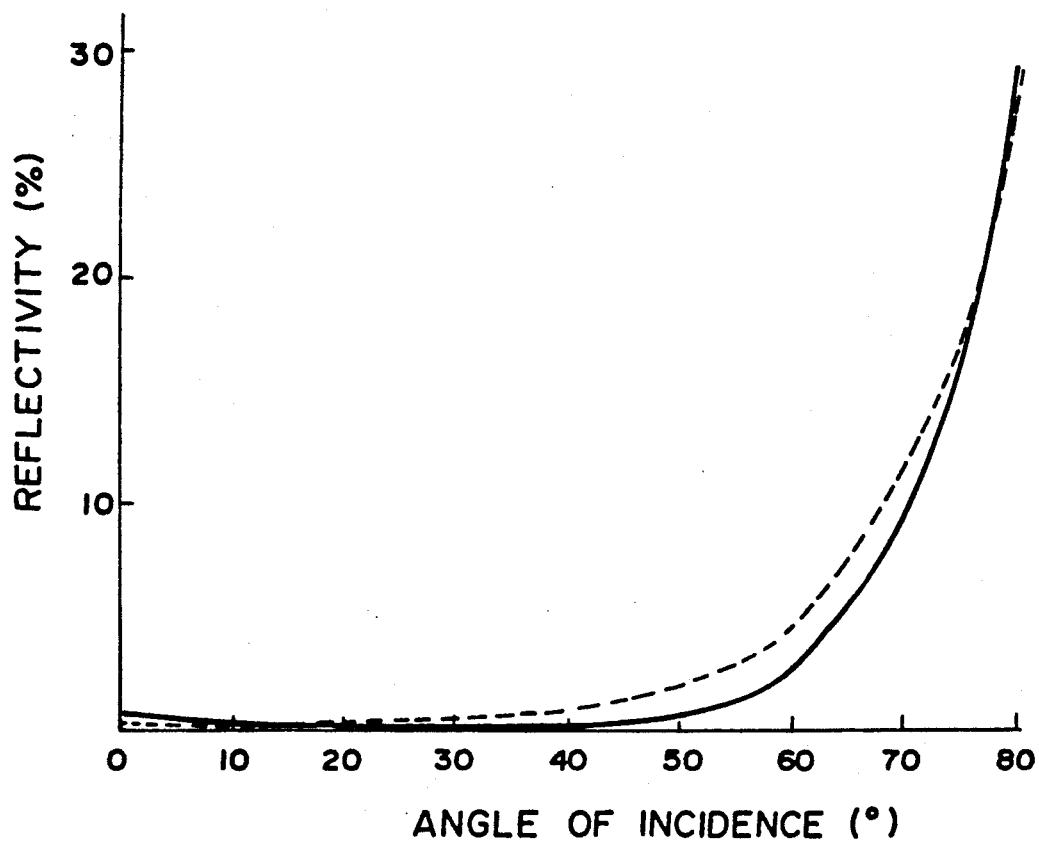
FIG. 3 is a graph showing the relationship between the angle of incidence of stimulating rays upon a stimulating ray antireflection film, which is employed in the embodiment of the radiation image read-out apparatus in accordance with the present invention, and the reflectivity of the stimulating rays from said stimulating ray antireflection film, and the relationship between the angle of incidence of the stimulating rays upon a conventional stimulating ray antireflection film, and the reflectivity of the stimulating rays from the conventional stimulating ray antireflection film.

The stimulating ray antireflection film 15 is designed so that the reflectivity of the reflected stimulating rays 2a from the stimulating ray antireflection film 15 is lowest when the reflected stimulating rays 2a impinge at an angle of incidence thereupon which falls within the range of 30° to 50°. By way of example, the curve indicated by the solid line in FIG. 3 represents the relationship between the angle of incidence of stimulating rays (having a wavelength of 633 nm) upon the stimulating ray antireflection film 15 and the reflectivity of the stimulating rays from the stimulating ray antireflection film 15. As illustrated in FIG. 3, when the angle of incidence of the stimulating rays upon the stimulating ray antireflection film 15 is 20°, the reflectivity of the stimulating rays from the stimulating ray antireflection film 15 is 0.39%. When the angle of incidence of the stimulating rays upon the stimulating ray antireflection film 15 is 30°, the reflectivity is 0.24%. When the angle of incidence of the stimulating rays upon the stimulating ray antireflection film 15 is 40°, the reflectivity is 0.23%. When the angle of incidence of the stimulating rays upon the stimulating ray antireflection film 15 is 50°, the reflectivity is 0.72%. The reflectivity of the stimulating rays from the stimulating ray antireflection film 15 is lowest when the angle of incidence of the stimulating rays upon the stimulating ray antireflection film 15 is approximately 40°.

The curve indicated by the broken line in FIG. 3 represents the relationship between the angle of incidence of the stimulating rays upon a conventional stimulating ray antireflection film, and the reflectivity of the stimulating rays from the conventional stimulating ray antireflection film. The reflectivity is lowest (0.4%) when the angle of incidence of the stimulating rays upon the conventional stimulating ray antireflection film is 0°.

Each of the stimulating ray antireflection film 15 employed in accordance with the present invention and the conventional stimulating ray antireflection film was overlaid on the light input face 8a of the light guide member 8, and a radiation image stored on a stimulable phosphor sheet was read out. When the stimulating ray antireflection film 15 was overlaid on the light input face 8a in accordance with the present invention, the flare phenomenon could be reduced to a level of 1/1.6 as compared with cases where a conventional stimulating ray antireflection film was overlaid on the light input face 8a.

Reverting to FIG. 2, as indicated by the chained line, a reflection mirror 14 may be located facing the light guide member 8 so that the main scanning line (2c shown in FIG. 1) intervenes between the reflection mirror 14 and the light guide member 8. In such cases, a stimulating ray antireflection film 16 should preferably be overlaid on the reflection surface 14a of the reflection mirror 14 in order more efficiently to prevent the flare phenomenon from occurring. It is necessary for the stimulating ray antireflection film 16 to be capable of substantially reflecting the light 10a emitted by a stimulable phosphor sheet. As the stimulating ray antireflection film 16, a dichroic film, which selectively transmits only the stimulating rays and reflects only the light 10a emitted by a stimulable phosphor sheet, is suitable. The stimulating ray antireflection film 16 overlaid on the reflection surface 14a of the reflection mirror 14 must be designed so that the reflectivity of the reflected stimulating rays 2a from the stimulating ray antireflection film 16 is lowest when the reflected stimulating rays 2a impinge at an angle of incidence, which falls within the range of 30° to 50°, upon the stimulating ray antireflection film 16.

The stimulating ray antireflection film described above may be overlaid on only either one of the light input face 8a of the light guide member 8 and the reflection surface 14a of the reflection mirror 14.

Also, the radiation image read-out apparatus in accordance with the present invention is not limited to an apparatus provided with a comparatively large-sized light guide member 8 and small-sized photodetector 9, which is connected to the light output face of the light guide member 8. For example, as proposed in U.S. Pat. Application Ser. No. 141,259, now U.S. Pat. No. 4,864,134, a long photomultiplier may be positioned such that its light receiving face extends along a main scanning line on a stimulable phosphor sheet, and a comparatively small-sized light guide member may be connected to the light receiving face of the long photomultiplier.

We claim:

1. A radiation image read-out apparatus comprising:
   (i) a main scanning means which scans a stimulable phosphor sheet, on which a radiation image has been stored, with stimulating rays in a main scanning direction, the stimulating rays causing the stimulable phosphor sheet to emit light in proportion to the amount of energy stored thereon during its exposure to radiation,
   (ii) a sub-scanning means which moves the stimulable phosphor sheet with respect to the stimulating rays in a sub-scanning direction approximately normal to the main scanning direction,
   (iii) a light guide member which has a light input face extending along a main scanning line on the stimulable phosphor sheet and which guides the light emitted by the stimulable phosphor sheet and entering the light guide member at its light input face to a light output face of the light guide member, and
   (iv) a photodetector which is connected to the light output face of the light guide member,
   wherein the improvement comprises the provision of a stimulating ray antireflection film, which is overlaid on said light input face of said light guide member and which comprises means for preventing said stimulating rays from being reflected by said light input face,
   said stimulating ray antireflection film being designed so that the reflectivity of said stimulating rays from said stimulating ray antireflection film is lowest when said stimulating rays impinge thereupon at an angle of incidence which falls within the range of 30° to 50°.

2. An apparatus as defined in claim 1 wherein said stimulating ray antireflection film also comprises means for preventing said light emitted by said stimulable phosphor sheet from being reflected by said light input face.

3. An apparatus as defined in claim 1 wherein said stimulating ray antireflection film is constituted of a plurality of vacuum evaporated layers overlaid on said light input face of said light guide member.

4. An apparatus as defined in claim 1 wherein a filter, which transmits only light having wavelengths within the wavelength distribution range of said light emitted by said stimulable phosphor sheet and filters out light having wavelengths within the wavelength distribution range of said stimulating rays, is positioned between said light output face of said light guide member and a light receiving face of said photodetector so that said filter is in close contact with said light receiving face of said photodetector.

5. An apparatus as defined in claim 1 wherein said light guide member has a linear light input face positioned along the main scanning line on said stimulable phosphor sheet and which has a ring-shaped light output face, and said photodetector has a light receiving face which is connected to said ring-shaped light output face.

6. An apparatus as defined in claim 1 wherein said photodetector is a photomultiplier, a light receiving face of which extends along the main scanning line on said stimulable phosphor sheet, and said light guide member has a light output face which is connected to said light receiving face of said photomultiplier.

7. A radiation image read-out apparatus comprising:
   (i) a main scanning means which scans a stimulable phosphor sheet, on which a radiation image has been stored, with stimulating rays in a main scanning direction, the stimulating rays causing the stimulable phosphor sheet to emit light in proportion to the amount of energy stored thereon during its exposure to radiation,
   (ii) a sub-scanning means which moves the stimulable phosphor sheet with respect to the stimulating rays in a sub-scanning direction approximately normal to the main scanning direction,
   (iii) a light guide member which has a light input face extending along a main scanning line on the stimulable phosphor sheet and which guides the light emitted by the stimulable phosphor sheet and entering the light guide member at its light input face to a light output face of the light guide member,
   (iv) a photodetector which is connected to the light output face of the light guide member, and
   (v) a reflection mirror which is positioned facing said light input face of said light guide which is positioned facing said light intervening between said reflection mirror and said light input face, said reflection mirror reflecting said light, which has been emitted by said stimulable phosphor sheet, towards said light input face,
   wherein the improvement comprises the provision of:
   (a) a stimulating ray antireflection film, which is overlaid on said light input face of said light guide member and which comprises means for preventing said stimulating rays from being reflected by said light input face,
   said stimulating ray antireflection film being designed so that the reflectivity of said stimulating rays from said stimulating ray antireflection film is lowest when said stimulating rays impinge thereupon at an angle of incidence which falls within the range of 30° to 50°, and/or
   (b) a stimulating ray antireflection film, which is overlaid on a reflection surface of said reflection mirror and which comprises means for preventing said stimulating rays from being reflected by said reflection surface,
   said stimulating ray antireflection film being designed so that the reflectivity of said stimulating rays from said stimulating ray antireflection film is lowest when said stimulating rays impinge thereupon at an angle of incidence which falls within the range 30° to 50°.

8. An apparatus as defined in claim 7 wherein said stimulating ray antireflection film, which is overlaid on said light input face of said light guide member, also comprises means for preventing said light emitted by said stimulable phosphor sheet from being reflected by said light input face.

9. An apparatus as defined in claim 7 wherein said stimulating ray antireflection film, which is overlaid on said light input face of said light guide member, is constituted of a plurality of vacuum evaporation layers which are overlaid on said light input face of said light guide member.

10. An apparatus as defined in claim 7 wherein said stimulating ray antireflection film, which is overlaid on said reflection surface of said reflection mirror, substantially reflects said light emitted by said stimulable phosphor sheet.

11. An apparatus as defined in claim 7 wherein said stimulating ray antireflection film, which is overlaid on said reflection surface of said reflection mirror, is a dichroic film which transmits only said stimulating rays and reflects only said light emitted by said stimulable phosphor sheet.

12. An apparatus as defined in claim 7 wherein a filter, which transmits only light having wavelengths within the wavelength distribution range of said light emitted by said stimulable phosphor sheet and filters out light having wavelengths within the wavelength distribution range of said stimulating rays, is positioned between said light output face of said light guide member and a light receiving face of said photodetector so that said filter is in close contact with said light receiving face of said photodetector.

13. An apparatus as defined in claim 7 wherein said light guide member has a linear light input face positioned along the main scanning line on said stimulable phosphor sheet and which has a ring-shaped light output face, and said photodetector has a light receiving face of which is connected to said ring-shaped light output face.

14. An apparatus as defined in claim 7 wherein said photodector is a photomultiplier, a light receiving face of which extends along the main scanning line on said stimulable phosphor sheet, and said light guide member has a light output face which is connected to said light receiving face of said photomultiplier.

* * * * *